United States Patent
Nakashima et al.

(10) Patent No.: US 9,581,753 B2
(45) Date of Patent: Feb. 28, 2017

(54) OPTICAL WAVEGUIDE SHEET, EDGE-LIT BACKLIGHT UNIT AND LAPTOP COMPUTER

(71) Applicant: KEIWA INC., Osaka (JP)

(72) Inventors: Hironori Nakashima, Osaka (JP); Akira Furuta, Osaka (JP)

(73) Assignee: Keiwa Inc., Osaka (JP)

( * ) Notice: Subject to any disclaimer, the term of this patent is extended or adjusted under 35 U.S.C. 154(b) by 0 days.

(21) Appl. No.: 14/039,375

(22) Filed: Sep. 27, 2013

(65) Prior Publication Data

US 2014/0092626 A1   Apr. 3, 2014

(30) Foreign Application Priority Data

Sep. 28, 2012   (JP) .................................. 2012-218699

(51) Int. Cl.
  *F21V 8/00*   (2006.01)
(52) U.S. Cl.
  CPC .......... *G02B 6/0055* (2013.01); *G02B 6/0093* (2013.01)
(58) Field of Classification Search
  CPC ........... G02F 1/13338; G02F 1/133308; G02F 1/133512; G02F 1/133536; G02F 1/133524; G02F 1/133615; G02F 2001/133607; G06F 1/1652; G06F 3/0412; G06F 3/0488; G06F 2203/04103; G02B 6/0055; G02B 5/30; G02B 6/00; G02B 6/0065; G02B 6/0036; G02B 6/0035; G02B 6/0093; F21K 9/56; G09G 2300/0426; H01L 51/5253; H01L 51/56; H01L 33/60; B29D 11/00644; B29D 11/0073; B29D 11/00788; B44F 1/045; F21V 13/04; G09F 13/18; H03K 2217/960785; H03K 2217/96079

USPC .... 345/173; 349/12, 96; 362/606, 611, 97.2; 385/131; 445/24; 252/299.01; 361/679.21

See application file for complete search history.

(56) References Cited

U.S. PATENT DOCUMENTS

| | | | |
|---|---|---|---|
| 3,989,672 A | | 11/1976 | Vestergaard |
| 4,871,487 A | * | 10/1989 | Laursen ................. B29C 47/12 264/1.29 |
| 2006/0078692 A1 | * | 4/2006 | Murakami et al. .......... 428/1.31 |

FOREIGN PATENT DOCUMENTS

| | | |
|---|---|---|
| CN | 1940674 | 4/2007 |
| CN | 101793381 | 8/2010 |

(Continued)

*Primary Examiner* — Stephen F Husar
*Assistant Examiner* — Danielle Allen
(74) *Attorney, Agent, or Firm* — Norris McLaughlin & Marcus, P.A.

(57) ABSTRACT

The optical waveguide sheet of the present invention is an optical waveguide sheet for use in an edge-lit backlight unit of a liquid crystal display unit of laptop computers having a housing thickness of no greater than 21 mm, and includes an optical waveguide layer containing a polycarbonate-based resin as a principal component; and a protective layer laminated on the back face of the optical waveguide layer, the protective layer containing an acrylic resin as a principal component, wherein an average thickness of the optical waveguide sheet is no lower than 250 μm and no greater than 600 μm. An average thickness of the protective layer is preferably no less than 10 μm and no greater than 100 μm, and a relative refractive index of the protective layer with respect to the optical waveguide layer is preferably no greater than 0.95.

9 Claims, 3 Drawing Sheets

(56) References Cited

FOREIGN PATENT DOCUMENTS

| | | |
|---|---|---|
| CN | 102612661 | 7/2012 |
| CN | 102667540 A | 9/2012 |
| JP | 3-182524 | 8/1991 |
| JP | 8-146230 A | 6/1996 |
| JP | 8286043 | 11/1996 |
| JP | 2005-186584 | 7/2005 |
| JP | 2005-314712 | 11/2005 |
| JP | 2006-091698 | 4/2006 |
| JP | 2008-299117 A | 12/2008 |
| JP | 2009-522717 A | 6/2009 |
| JP | 2010-177130 | 8/2010 |
| JP | 2011-76101 A | 4/2011 |
| JP | 2011-112834 A | 6/2011 |
| JP | 3169985 U | 8/2011 |
| KR | 20000004781 | 1/2000 |
| KR | 20120077663 | 7/2012 |
| TW | 200921156 | 5/2009 |
| TW | 201042303 | 12/2010 |
| TW | 201135293 | 10/2011 |
| TW | 201224540 | 6/2012 |
| WO | 2011/074399 A1 | 6/2011 |
| WO | WO-2011/074399 | 6/2011 |
| WO | 2012/081394 A1 | 6/2012 |

\* cited by examiner (A)

(B)

OPTICAL WAVEGUIDE SHEET, EDGE-LIT BACKLIGHT UNIT AND LAPTOP COMPUTER

BACKGROUND OF THE INVENTION

Field of the Invention

The present invention relates to an optical waveguide sheet, an edge-lit backlight unit and a laptop computer.

Discussion of the Background

Liquid crystal display devices in widespread use have been in a backlight system where light emission is executed by irradiating onto a liquid crystal layer from the rear face. In this system, a backlight unit such as an edge-lit backlight unit and a direct-lit backlight unit is mounted on the underside of the liquid crystal layer. As shown in FIG. 4, such an edge-lit backlight unit 110 generally includes a top plate 116 disposed on the backmost face of a liquid crystal display unit, a reflection sheet 115 disposed on the front face of the top plate 116, an optical waveguide sheet 111 disposed on the front face of the reflection sheet 115, and a light source 117 that emits rays of light toward the end face of the optical waveguide sheet 111 (see Japanese Unexamined Patent Application, Publication No. 2010-177130). In the edge-lit backlight unit 110 shown in FIG. 4, rays of light that are emitted by the light source 117 and enter the optical waveguide sheet 111 propagate in the optical waveguide sheet 111. A part of the propagating rays of light exit from the back face of the optical waveguide sheet 111, are reflected on the reflection sheet 115 and enter again into the optical waveguide sheet 111.

In laptop computer having such a liquid crystal display unit, in order to enhance its portability and user-friendliness, a reduction in thickness and weight is required, leading to a requirement also for a reduction in thickness of the liquid crystal display unit. In particular, in a thinner type laptop computer referred to as Ultrabook (registered trademark) in which the thickness of the thickest part of its housing is no greater than 21 mm, it is desired that the thickness of the liquid crystal display unit is about 4 mm to 5 mm, and thus, further a reduction in thickness of the edge-lit backlight unit incorporated into the liquid crystal display unit has been desired.

In regard to an edge-lit backlight unit 210 of such Ultrabook, as shown in FIG. 5, an edge-lit backlight unit is also proposed in which a reduction in thickness is attempted by dispensing with the reflection sheet 115 as shown in FIG. 4. The edge-lit backlight unit 210 shown in FIG. 5 includes a metal top plate 216, an optical waveguide sheet 211 overlaid on the front face of the top plate 216, and a light source 217 that emits rays of light toward the end face of the optical waveguide sheet 211, in which the front face of the top plate 216 is finished by polishing and functions as a reflection surface 216a. In this example, the rays of light that are emitted by the light source 217 and enter the optical waveguide sheet 211 propagate in the optical waveguide sheet 211, and a part of the propagating rays of light exit from the back face of the optical waveguide sheet 211, are reflected on the reflection surface 216a disposed on the front face of the top plate 216, and enter again the optical waveguide sheet 211. Thus, in the edge-lit backlight unit 210 shown in FIG. 5, the front face of the top plate 216 corresponds to the reflection surface 216a, and the reflection surface 216a can serve as the reflection sheet 115 shown in FIG. 4. Therefore, the edge-lit backlight unit 210 dispenses with the reflection sheet 115, leading to achievement of a reduction in thickness of the liquid crystal display unit.

PRIOR ART DOCUMENTS

Patent Documents

Patent Document 1: Japanese Unexamined Patent Application, Publication No. 2010-177130

SUMMARY OF THE INVENTION

The present inventors found that when a laptop computer having the edge-lit backlight unit 210 shown in FIG. 5 is used, a defect arises that luminance of the liquid crystal display surface is uneven (lack in uniformity of the luminance). The present inventors thoroughly investigated causes of the defect, and consequently found that the back face of the optical waveguide sheet 211 of the edge-lit backlight unit 210 grazes against the cop plate 216 to produce scuffs on the back face of the optical waveguide sheet 211, and rays of light that enter the scuffs are diffused, leading to the occurrence of the lack in uniformity of the luminance.

The present invention was made in view of the foregoing circumstances, and an object of the present invention is to provide an optical waveguide sheet by which, when used in an edge-lit backlight unit of a liquid crystal display device, the reduction in thickness of the liquid crystal display device is achieved while suppressing the lack in uniformity of the luminance of a liquid crystal display surface. Furthermore, another object of the present invention is to provide an edge-lit backlight unit and a laptop computer in which the lack in uniformity of the luminance is suppressed and the reduction in thickness is achieved.

According to an aspect of the present invention made for solving the aforementioned problems, an optical waveguide sheet is for use in an edge-lit backlight unit of a liquid crystal display unit in a laptop computer having a housing thickness of no greater than 21 mm, the optical waveguide sheet including:

an optical waveguide layer containing a polycarbonate-based resin as a principal component; and a protective layer laminated on the back face of the optical waveguide layer, the protective layer containing an acrylic resin as a principal component, an average thickness of the optical waveguide sheet being no less than 250 µm no greater than 600 µm.

Since the optical waveguide sheet has the protective layer containing the acrylic resin as a principal component on the back face of the optical waveguide layer containing the polycarbonate-based resin as a principal component, the scuff of the optical waveguide layer can be prevented by the protective layer even when the optical waveguide sheet is overlaid on, for example, the front face of a metal top plate and the optical waveguide sheet grazes'against the overlaid surface (inner face (front face) of the top plate). Thus, lack in uniformity of luminance caused by the scuff of the optical waveguide layer can be reliably prevented. Furthermore, since the average thickness of the optical waveguide sheet is no less than 250 µm and no greater than 600 µm, a reduction in thickness of the backlight unit employing the optical waveguide sheet is achieved.

In the optical waveguide sheet, an average thickness of the protective layer is preferably no less than 10 µm and no greater than 100 µm. When the average thickness of the protective layer is within the above range, the reduction in thickness of the optical waveguide sheet can be achieved while reliably preventing the scuff of the optical waveguide layer.

In the optical waveguide sheet, a relative refractive index of the protective layer with respect to the optical waveguide layer is preferably no greater than 0.98. When the relative refractive index is no greater than 0.95, a critical angle of total reflection can be no less than 71.8 degree in accordance with Snell's law. Thus, among the rays of light that enter from the optical waveguide layer the interface, rays of light having an angle of incidence of no less than 71.8 degree with respect to a normal of an interface with the protective layer are totally reflected on the interface. Thus, the optical waveguide sheet can allow the rays of incident light from the light source to reliably propagate in the optical waveguide layer.

The optical waveguide sheet preferably has light scattering portions colored through laser irradiation. Thus, part of the rays of light that propagate in the optical waveguide layer exit from the back face of the optical waveguide layer into the protective layer, and a part of the rays of light that exit from the back face of the optical waveguide layer enter the light scattering portions, leading to scattering of the rays of light. Furthermore, a part of the scattered rays of light enter again into the optical waveguide layer, and exit from the front face of the optical waveguide sheet. Thus, suitable rays of light are enabled to exit from the entire front face of the optical waveguide sheet by providing the light scattering portions at desired positions in the protective layer using laser irradiation.

In addition, the edge-lit backlight unit according to another aspect of the present invention includes a top plate disposed on the backmost face of a liquid crystal display unit, with a front face of the top plate being formed to have a reflection surface; the optical waveguide sheet having the configuration described above, the optical waveguide sheet being overlaid on the front face of the top plate; and a light source that emits rays of light toward the end face of the optical waveguide sheet.

Since the edge-lit backlight unit according to the aspect of the present invention has the optical waveguide sheet overlaid on the front face of the top plate, rays of light that exit from the back face side of the protective layer of the optical waveguide sheet are reflected on the reflection surface on the front face of the top plate and enter again the optical waveguide sheet. Thus, the edge-lit backlight unit does not employ a conventional reflection sheet, and therefore the reduction in thickness is achieved. In addition, according to the edge-lit backlight unit, due no the optical waveguide sheet being overlaid on the front face of the top plate, the protective layer of the optical waveguide sheet abuts the front face of the cop plate. The protective layer contains the acrylic resin as a principal component, therefore is unlikely to be scuffed, as described above, and accordingly the lack in uniformity of luminance can be reliably prevented.

According to the edge-lit backlight unit of the aspect of the present invention, it is preferred that the top plate is made of metal, and an arithmetic average roughness (Ra) of the reflection surface is no greater than 0.2 μm. The top plate is made of metal, and therefore the reflection surface can be easily and surely formed by polishing the surface thereof. Furthermore, when the arithmetic average roughness of the reflection surface is no greater than 0.2 μm, rays of light that exit from the back face of the optical waveguide sheet are likely to be specularly reflected on the reflection surface, leading to a high utilization efficiency of the rays of light, and furthermore the surface of the reflection surface becomes even, enabling the scuff of the back face of the optical waveguide sheet butting the reflection surface to be minimized.

Furthermore, the edge-lit backlight unit according to another aspect of the present invention may include a top plate disposed on the backmost face of a liquid crystal display unit; a reflection sheet overlaid on the front face of the top plate; the optical waveguide sheet having the configuration described above, the optical waveguide sheet being overlaid on the front face of the reflection sheet; and a light source that emits rays of light toward the end face of the optical waveguide sheet. Due to the edge-lit backlight unit having the aforementioned configuration, the edge-lit backlight unit can further prevent the lack in uniformity of luminance while achieving the reduction in thickness.

Another aspect of the present invention made for solving the aforementioned problems relates to a laptop computer that includes the edge-lit backlight unit having the configuration described above in a liquid crystal display unit.

Since the laptop computer includes the edge-lit backlight unit having the configuration described above, the laptop computer has the aforementioned advantages. When the front face of the top plate in the laptop computer functions as a reflection surface, the laptop computer does not require a conventional reflection sheet, leading to achievement of the reduction in thickness. In addition, although the protective layer of the optical waveguide sheet abuts the front face of the top plate, the protective layer contains an acrylic resin as a principal component and is unlikely to be scuffed, and therefore the lack in uniformity of luminance can be reliably prevented.

It is to be noted that the term "housing" as referred to means a casing that totally houses constructional elements of the laptop computer, and the term "top plate" as referred to means a platy member that is a part of the housing and disposed on the backmost face of a liquid crystal display unit of the laptop computer. The term "back face of an optical waveguide layer" as referred to means a surface on a top plate side of the optical waveguide layer, i.e., a surface on the other side of a display surface of the liquid crystal display unit. In addition, the term "front face" as referred to means a surface on the other side of the aforementioned back face, i.e., a surface on the side of the display surface of the liquid crystal display unit. The term "average thickness of a sheet" as referred to means an average of values determined, in accordance with A-2 method prescribed in JIS-K-7130, section 5.1.2. The term "relative refractive index of a protective layer with respect to an optical waveguide layer" as referred to means a value obtained by dividing an absolute refractive index of the protective layer by the absolute refractive index of the optical waveguide layer. It is to be noted that when the term "refractive index" is simply used herein, the term is used as meaning the absolute refractive index. The refractive index is measured using a light having a wavelength of 589.3 nm (sodium D line). The arithmetic average roughness (Ra) is a value obtained in accordance with JIS B0601-1994 under conditions involving a cut-off λc of 2.5 mm and an evaluation length of 2.5 mm.

Effects of the Invention

As explained in the foregoing, when the optical waveguide sheet according to the aspect of the present invention is used in an edge-lit backlight unit of a liquid crystal display device, a reduction in thickness of the edge-lit backlight unit is achieved while lack in uniformity of luminance of a liquid crystal display surface is suppressed. In addition, according to the edge-lit backlight unit and the laptop computer according to the aspects of the present invention, the lack in uniformity of luminance is suppressed and the reduction in thickness is achieved.

DESCRIPTION OF EMBODIMENTS

Hereinafter, preferred modes for carrying out the invention will be explained in more detail with references to the drawings, if necessary.

Laptop Computer 1

Figure 1:
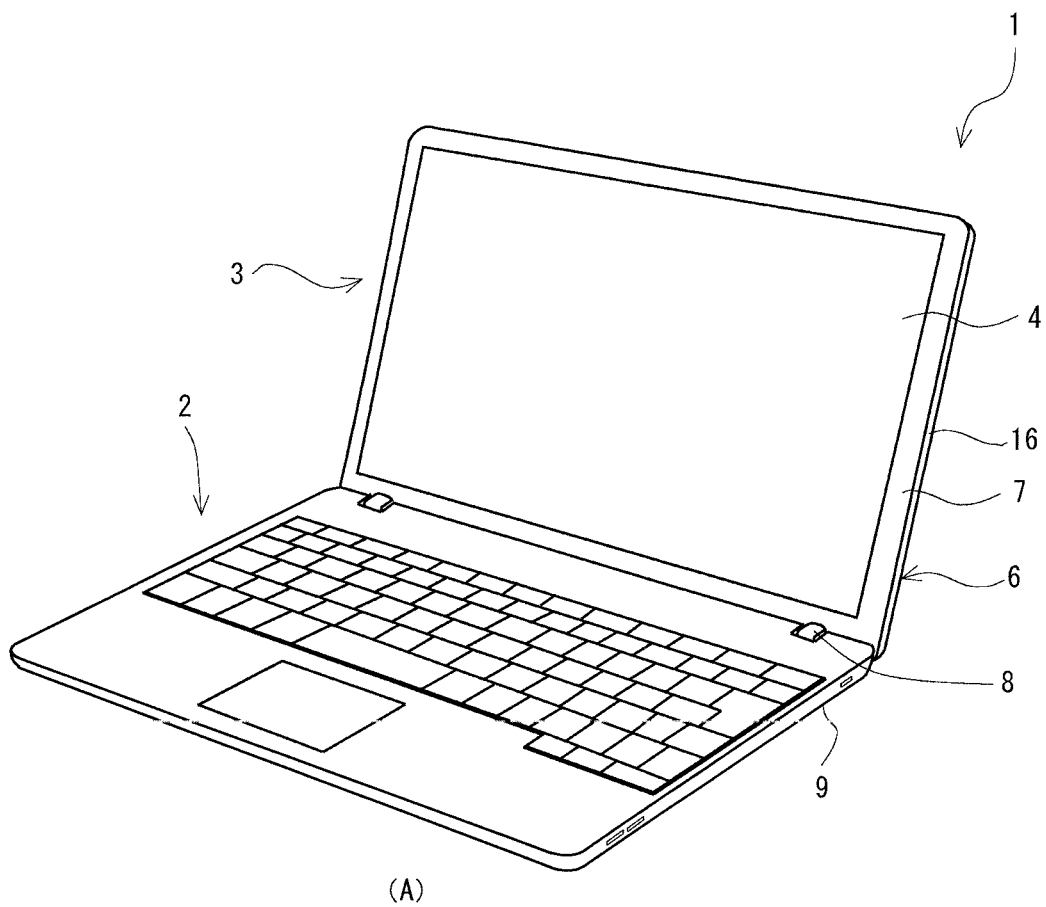
FIG. 1 is a schematic per view of a laptop computer according to an embodiment of the present invention illustrating: (A) a state in which a liquid crystal display unit is lifted; and (B) a state in which the liquid crystal display unit is closed.
Figure 1:
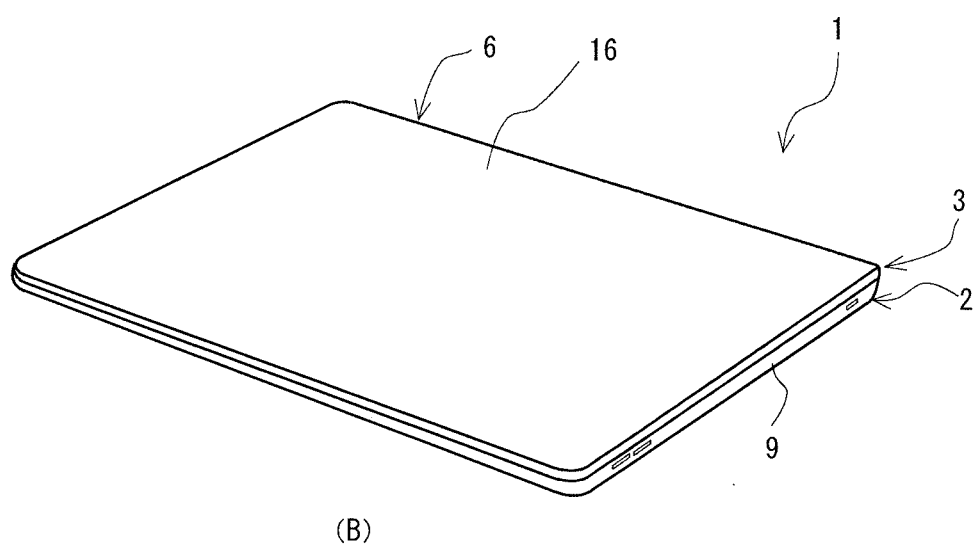

A laptop computer 1 shown in FIG. 1 includes an operation unit 2, and a liquid crystal display unit 3 rotatably (enabling to be opened/closed) attached to the operation unit 2. The laptop computer 1 has a housing thickness (at the thickest part (when the liquid crystal display unit 3 is closed)) of no greater than 21 mm, and is generally referred to as Ultrabook (registered trademark) (hereinafter, may be also referred to as "ultraslim computer 1").

The liquid crystal display unit 3 of the ultraslim computer 1 includes a liquid crystal panel 4, and an edge-lit backlight unit 10 (hereinafter, may be also referred to as "backlight unit 10") that directs rays of light from the back face side toward the liquid crystal panel 4. The liquid crystal panel 4 is held at the back face, the lateral face and a circumference of the front face by a casing for a liquid crystal display unit 6 of the housing. In this embodiment, the casing for a liquid crystal display unit 6 includes a top plate 16 disposed on the back face (i.e., the rear face) of the liquid crystal panel 4, and a front face support member 7 disposed on the front face side of the circumference of the front face of the liquid crystal panel 4. Note that the top plate 16, which is a partial member of the casing for a liquid crystal display unit 6, is provided so that its front face is formed to have a reflection surface 16a and functions as a partial member of the backlight unit 10, as described later. Note that the housing of the ultraslim computer 1 includes the casing for a liquid crystal display unit 6, and a casing for an operation unit 9 that is rotatably attached to the casing for a liquid crystal display unit 6 through a hinge part 8 and contains a central processing unit (ultra-low voltage CPU) and the like.

The thickness of the liquid crystal display unit 3 is not particularly limited as long as the housing thickness falls within a desired range, but the upper limit of the thickness of the liquid crystal display unit 3 is preferably 7 mm, more preferably 6 mm, and still more preferably 5 mm. On the other hand, the lower limit of the thickness of the liquid crystal display unit 3 is preferably 2 mm, more preferably 3 mm, and still more preferably 4 mm. When the thickness of the liquid crystal display unit 3 exceeds the above upper limit, it may be difficult to satisfy a requirement of a reduction in thickness of the ultraslim computer 1. Furthermore, when the thickness of the liquid crystal display unit 3 is less than the above lower limit, a decrease in strength and/or in luminance of the liquid, crystal display unit 3 may be incurred.

Backlight

Figure 2:
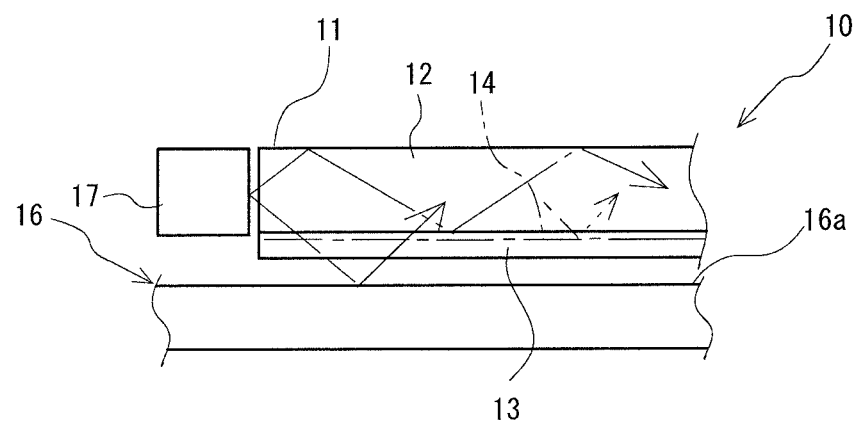
FIG. 2 is a schematic cross sectional view illustrating an edge-lit backlight unit of the laptop computer shown in FIG. 1.

The backlight unit 10 includes an optical waveguide sheet 11, a top plate 16 on which the optical waveguide sheet 11 is directly overlaid, and a light source 17 that emits rays of light toward the optical waveguide sheet 11, as shown in FIG. 2. In other words, the backlight unit 10 does not include a reflection sheet conventionally disposed between the top plate 16 and the optical waveguide sheet 11.

Optical Waveguide Sheet 11

Figure 3:
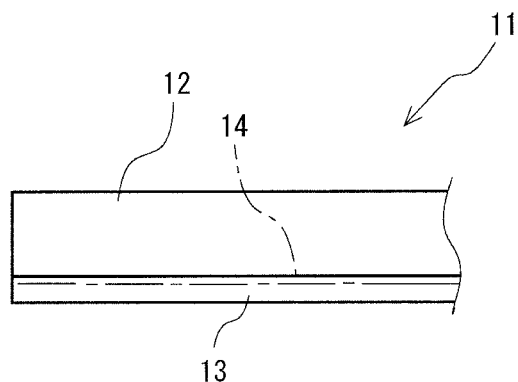
FIG. 3 is a schematic cross sectional view illustrating an optical waveguide sheet of the edge-lit backlight unit shown in FIG. 2.
Figure 4:
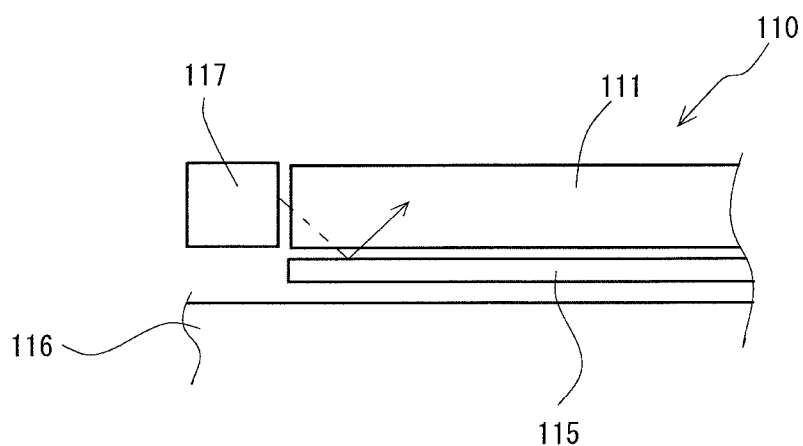
FIG. 4 is a schematic cross sectional view illustrating a conventional edge-lit backlight unit.
Figure 5:
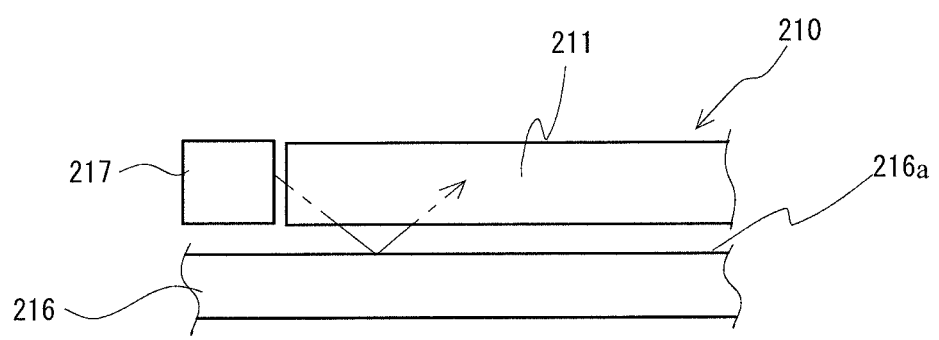
FIG. 5 is a schematic cross sectional view illustrating a conventional edge-lit backlight unit other than that shown in FIG. 4.

The optical waveguide sheet 11 according to the embodiment of the present invention is a sheet having a two-layer structure composed of an optical waveguide layer 12 and a protective layer 13, as shown in FIG. 3. The optical waveguide sheet 11 is formed into a plate (non-wedge shape) that is in a substantially square shape in a planar view, and has a substantially uniform thickness in the plane direction. The average thickness of the optical waveguide sheet 11 is no less than 280 µm and no greater than 600 µm. The upper limit of the average thickness of the optical waveguide sheet 11 is more preferably 580 µm, and still more preferably 550 µm. On the other hand, the lower limit of the average thickness of the optical waveguide sheet 11 is more preferably 280 pap and still more preferably 300 µm. When the average thickness exceeds the above upper limit, it may be difficult to satisfy a requirement of a reduction in thickness of the backlight unit 10 desired in the ultraslim computer 1. In addition, when the average thickness is less than the above lower limit, the strength of the optical waveguide sheet 11 may be insufficient, and a sufficient amount of the rays of light from the light source 17 may not be directed to the optical waveguide sheet 11.

The optical waveguide layer 12 is a transparent resin layer that contains a polycarbonate-based resin as a principal component. Since the polycarbonate-based resin has a high degree of transparency, a loss of the rays of light in the optical waveguide layer 12 can be minimized, in addition, since the polycarbonate-based resin has a high refractive index, total reflection is likely to occur at the interface (the front face of the optical waveguide layer 12) between the optical waveguide layer 12 and an air layer (an air layer in a gap between the optical waveguide layer 12 and the liquid crystal panel), and at the interface between the optical waveguide layer 12 and the protective layer 13, allowing for efficient propagation of the rays of light. Furthermore, since the polycarbonate-based resin has heat resistance, its deterioration or the like caused by heat generation in the light source 17 is minimized.

The polycarbonate-based resin is not particularly limited, and may be any one of a linear polycarbonate-based resin and a branched polycarbonate-based resin, or may be a mixture of polycarbonate-based resins that contains both of the linear polycarbonate-based resin and the branched polycarbonate-based resin.

The polycarbonate-based resin is a linear aromatic polycarbonate-based resin produced by a well-known phosgene process or a melt process, and is constituted with a carbonate unit and a diphenol unit. Examples of a precursor for introducing the carbonate unit include phosgene, diphenyl carbonate, and the like. Furthermore, examples of the diphenol include 2,2-bis(4-hydroxyphenyl)propane, 2,2-bis(3,5- dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)decane, 1,1-bis(4-hydroxyphenyl)propane, 1,1-bis(4-hydroxyphenyl)cyclodecane, 1,1-bis(3,5-dimethyl-4-hydroxyphenyl)cyclododecane, 4,4'-dihydroxydiphenyl ether, 4,4'-thiodiphenol, 4,4'-dihydroxy-3,3-dichlorodiphenyl ether, and the like. These may be used either alone, or in combination of two or more thereof. The linear polycarbonate-based resin is produced by a method disclosed in, for example, U.S. Pat. No. 3,989,672, and the like.

The branched polycarbonate-based resin is a polycarbonate-based resin produced using a branching agent, and examples of the branching agent include phloroglucin, trimellitic acid, 1,1,1-tris(4-hydroxyphenyl)ethane, 1,1,2-tris(4-hydroxyphenyl)ethane, 1,1,2-tris(4-hydroxyphenyl)propane, 1,1,1-tris(4-hydroxyphenyl)methane, 1,1,1-tris(4-hydroxyphenyl)propane, 1,1,1-tris(2-methyl-4-hydroxyphenyl)methane, 1,1,1-tris(2-methyl-4-hydroxyphenyl)ethane, 1,1,1-tris(3-methyl-4-hydroxyphenyl)methane, 1,1,1-tris(3-methyl-4-hydroxyphenyl)ethane, 1,1,1-tris(3,5-dimethyl-4-hydroxyphenyl)methane, 1,1,1-tris(3,5-dimethyl-4-hydroxyphenyl)ethane, 1,1,1-tris(3-chloro-4-hydroxyphenyl)methane, 1,1,1-tris(3-chloro-4-hydroxyphenyl)ethane, 1,1,1-tris(3,5-dichloro-4-hydroxyphenyl)methane, 1,1,1-tris(3,5-dichloro-4-hydroxyphenyl)ethane, 1,1,1-tris(3-bromo-4-hydroxyphenyl)methane, 1,1,1-tris(3-bromo-4-hydroxyphenyl)ethane, 1,1,1-tris(3,5-dichloro-4-hydroxyphenyl)methane, 1,1,1-tris(3,5-dibromo-4-hydroxyphenyl)ethane, 4,4'-dihydroxy-2,5-dihydroxydiphenyl ether, and the like.

The branched polycarbonate-based resin can be produced, for example, by a method in which a polycarbonate oligomer derived from an aromatic diphenol, the branching agent and phosgene, an aromatic diphenol and a chain-end terminator are reacted with stirring so that the reaction mixture liquid containing the components is under turbulent flow conditions, and upon the increase in the viscosity of the reaction mixture liquid, an aqueous alkali solution is added and the reaction mixture liquid is allowed to react under laminar flow conditions, as disclosed in Japanese Unexamined Patent Application, Publication No. H03-182524.

The optical waveguide layer 12 preferably contains the branched polycarbonate-based resin in an amount within the range of no less than 5% by weight and no greater than 80% by weight, and more preferably within the range of no less than 10% by weight and no greater than 60% by weight in the polycarbonate-based resin. This is because when the amount of the branched polycarbonate-based resin is less than 5% by weight, an extensional viscosity of the resin is decreased and molding by extrusion molding is difficult, whereas the amount of the branched polycarbonate-based resin exceeding 80% by weight result in an increased shear viscosity of the resin and molding processibility of the resin is impaired.

Although the optical waveguide layer 12 may contain other optional component, the optical waveguide layer 12 preferably contains the linear polycarbonate-based resin and/or the branched polycarbonate-based resin in an amount of preferably no less than 90% by mass, and more preferably no less than 98% by mass. Examples of the optional component used in the optical waveguide layer 12 include an ultraviolet ray absorbing agent, a stabilizer, a lubricant, a processing aid, a plasticizer, an anti-impact agent, a retardation reducing agent, a delustering agent, an antimicrobial, a fungicide, and the like. However, since the optical waveguide layer 12 must allow for the propagation of the rays of light, the optical waveguide layer 12 is preferably formed transparent, and particularly preferably formed colorless and transparent.

The thickness of the optical waveguide layer 12 is substantially uniform along the plane direction. The average thickness of the optical waveguide layer 12 is not particularly limited, but is preferably no less than 200 µm and no greater than 590 µm. The upper limit of the average thickness of the optical waveguide layer 12 is more preferably 570 µm, and still more preferably 550 µm. Furthermore, the lower limit of the average thickness of the optical waveguide layer 12 is more preferably 220 µm, and still more preferably 240 µm. When the average thickness exceeds the above upper limit, the optical waveguide sheet 11 is so thick that it may be difficult to satisfy a requirement of a reduction in thickness of the backlight unit 10 desired in the ultraslim computer 1. On the other hand, when the average thickness is less than the above lower limit, the optical waveguide sheet 11 is so thin that its strength may be insufficient, and a sufficient amount of the rays of light from the light source 17 may not be directed to the optical waveguide layer 12.

In addition, the refractive index of the optical waveguide layer 12 is preferably no less than 1.57 and no greater than 1.68, and more preferably no less than 1.59 and no greater than 1.66.

The protective layer 13 is laminated on the back face of the optical waveguide layer 12. The protective layer 13 contains an acrylic resin, as a principal component. Since the acrylic resin is harder as compared with the polycarbonate based resin, the protective layer 13 is harder than the optical waveguide layer 12. In this embodiment, pencil hardness of the protective layer 13 is preferably at least HB and at most 4H, and more preferably at least H and at most 3H.

The acrylic resin is not particularly limited, and is a resin that has an acrylic acid-derived or methacrylic acid-derived skeleton. Examples thereof include, but not particularly limited to: poly (meth)acrylic acid esters such as polymethyl methacrylate; methyl methacrylate-(meth)acrylic acid copolymers; methyl methacrylate-(meth)acrylic acid ester copolymers; methyl methacrylate-acrylic acid ester-(meth)acrylic acid copolymers; methyl (meth)acrylate-styrene copolymers; polymers having an alicyclic hydrocarbon group (for example, methyl methacrylate-cyclohexyl methacrylate copolymers, and methyl methacrylate-norbornyl (meth)acrylate copolymers); and the like. Among these acrylic resins, poly(C1-6 alkyl (meth)acrylate)s such as polymethyl (meth)acrylate are preferred, and methyl methacrylate-based resins are more preferred.

The protective layer 13 is substantially uniform in thickness in the plane direction. The average thickness of the protective layer 13 is not particularly limited, but the protective layer 13 is preferably provided thinner than the optical waveguide layer 12. Specifically, the average thickness of the protective layer 13 is preferably no less than 10 µm and no greater than 100 µm. The upper limit of the average thickness of the protective layer 13 is preferably 90 µm, and more preferably 80 µm. In addition, the lower limit of the average thickness of the protective layer 13 is more preferably 20 µm, and still more preferably 30 µm. When the average thickness exceeds the above upper limit, a reduction in thickness of the optical waveguide sheet 11 may not be achieved, and curling (winding) is highly likely to occur due to the difference in coefficient of thermal shrinkage between the optical waveguide layer 12 and the protective layer 13.

On the other hand, when the average thickness is less than the above lower limit, protection of the optical waveguide layer 12 may be insufficient.

Note that the refractive index of the Protective layer 13 is preferably no less than 1.47 and no greater than 1.51, and more preferably no less than 1.48 and no greater than 1.50.

A relative refractive index of the protective layer 13 with respect to the optical waveguide layer 12 is not particularly limited, but is preferably no greater than 0.95, more preferably no greater than 0.90, and particularly preferably no greater than 0.85. When the relative refractive index of the protective layer 13 with respect to the optical waveguide layer 12 is no greater than the above upper limit, a critical angle of total reflection is no greater than a certain angle (no greater than 71.8 degree) in accordance with Snell's law. Thus, among the rays of light that enter from the optical waveguide layer 12 an interface with the protective layer 13, the rays of light having an angle of incidence of no less than the above critical angle are totally reflected on the interface between the optical waveguide layer 12 and the protective layer 13. On the other hand, a part of the rays of light having an angle of incidence of less than the above critical angle are reflected to the optical waveguide layer 12, and the other part thereof enters the protective layer 13.

The protective layer 13 includes light scattering portions 14 that scatter rays of light. The light scattering portions 14 are formed to be colored through laser irradiation. Specifically, the light scattering portions 14 are formed by incorporating a coloring agent into a forming material of the protective layer 13 that contains an acrylic resin as a principal component, laminating the forming material of the protective layer 13 on the back face of the optical waveguide layer 12 to form the protective layer 13, and irradiating the formed protective layer 13 with a laser to allow the coloring agent to develop a color.

The coloring agent dispersed in the forming material of the protective layer 13 is a pigment that changes its color upon laser irradiation. Well-known organic and inorganic substances used as a laser marking agent can be used as the coloring agent. Specifically, examples thereof include: yellow iron oxide; inorganic lead compounds; manganese violet; cobalt violet; compounds of a metal such as mercury, cobalt, copper, bismuth and nickel; pearlescent pigments; silicon compounds; micas; kaolins; silica sand; diatomaceous earth, talc; and the like. These may be used either alone, or in combination of two or more thereof. However, since, formation of a reflecting pattern that reflects rays of light in the optical waveguide sheet 11 is intended through laser irradiation, it is preferred for a dot shape or the like that constitutes the reflection pattern to have a color that reflects rays of light. Therefore, it is preferred to incorporate into the optical waveguide sheet 11 a coloring agent that produces a white color upon laser irradiation, whereas, to the contrary, coloring agents that are carbonized upon the laser irradiation and turn to black which absorbs rays of light are unsuitable for the present invention. Examples of such a coloring agent that produces a white color include titan black, cordierite, mica, and the like.

In addition to inorganic compounds represented by the composition formula of $MgAl_3(AlSi_5O_{18})$, analogs thereof in which a part of Mg is replaced by Fe can be used as the cordierite. Alternatively, moisture-containing cordierite can be also used.

Natural micas such as muscovite, phlogopite, biotite and sericite, and synthetic micas such as fluorphlogopite and tetrasilicic fluorine mica can be used as the mica.

The content of the coloring agent in the protective layer 13 is preferably no less than 0.0001% by mass and no greater than 2.5% by mass, and more preferably no less than 0.1% by mass and no greater than 1% by mass. When the content of the coloring agent is less than the above lower limit, sufficient color production effects may not be exerted upon the laser irradiation, and therefore a desired reflection pattern may not be formed. To the contrary, when the content of the coloring agent exceeds the above upper limit, the degree of transparency, mechanical strength and the like of the protective layer 13 may be impaired.

The light scattering portions 14 are formed into a scattered dot-like disposition pattern in a planar view (a drawing in a planar view is not shown). The disposition pattern of the light scattering portions 14 is formed so that uniform rays of light exit from the optical waveguide sheet 11 toward the front face side. Specifically, the light scattering portions 14 are formed so that a proportion of the light scattering portions 14 are low at a position adjacent to the light, source and increases with an increasing distance from the light source, it is to be noted that the proportion of the light scattering portions 14 can be adjusted by changing the number of the light scattering portions 14 while keeping the size of the respective light scattering portions 14 constant, or by changing the size of the respective light scattering portions 14.

The shape of the respective light scattering portions 14 in a planar view may be linear, circular, elliptical, rectangular, or the like. In addition, the size of the respective light scattering portions 14 (in a planar view) is not particularly limited, but for example, the maximum width thereof is preferably no greater than 200 µm, and more preferably no greater than 100 µm. Furthermore, the light scattering portions 14 may have in a three-dimensional shape having a height in the sheet-thickness direction. When the light scattering portions 14 have the three-dimensional shape, the shape may be semi-spherical, conular, cylindrical, polygonal pyramidal, polygonal columnar, ungual, or the like.

A laser used for irradiation of the protective layer 13 is not particularly limited, and for example, a carbon dioxide laser, a carbon monoxide laser, a semiconductor laser, a YAG (yttrium-aluminum-garnet) laser and the like may be used. Among these, a carbon dioxide laser is suitable for forming a fine not pattern, since the carbon dioxide laser produces beams having a wavelength of 9.3 µm to 10.6 µm. A transversely excited atmospheric (TEA) type, a continuous oscillation type, and a repetitively pulsed carbon dioxide laser and the like may be used as the carbon dioxide laser.

The top plate 16 is formed of a metal plate, and specifically, an aluminum plate. In this embodiment, the thickness of the plate is preferably no less than 500 µm and no greater than 1200 µm, and more preferably no less than 700 µm and no greater than 900 µm. In addition, the top plate 16 is formed so that the circumference of the plate is curved toward the front face side, and this curved portion functions as a rib, whereby the top plate 15 has a sufficient strength it is to be noted that although a portion (central portion) other than the curved portion as the rib has a flat face, the central portion may be embossed with a pattern such as a geometrical pattern.

A reflection surface 16a, which reflects rays of light, is provided on the front face (a surface on the side of the liquid crystal panel 4) of the top plate 16. Thus, the rays of light that exit from the back face of the optical waveguide sheet 11 are reflected on the reflection surface 16a toward the front face side.

Although the reflection surface 16a is formed by polishing the front face of (material plate of) the top plate 16, this forming method is not particularly limited, and a method other than the polishing can be employed.

The arithmetic average roughness (Ra) of the reflection surface 16a (the front face of the material plate of the top plate 16) is not particularly limited, but is preferably no greater than 0.2 μm, more preferably no greater than 0.1 μm, and still more preferably no greater than 0.05 μm. When the arithmetic average roughness (Ra) of the reflection surface 16a exceeds the above upper limit, rays of light that enter the reflection surface 16a may be unlikely to be specularly reflected, whereby a utilization efficiency of the rays of light may be decreased.

Light Source 17

The light source 17 is contained in the casing for a liquid crystal display unit 6, and disposed so that an emission surface faces to (or abuts) the end face of the optical waveguide layer 12 of the optical waveguide sheet 11. Various types of light sources can be used as the light source 17, and for example, a light emitting diode (LED) can be used. Specifically, a light source in which a plurality of light emitting diodes are disposed along the end face of the optical waveguide layer 12 may be used as the light source 17.

In the backlight unit 10, the following systems may be employed such as a unilateral edge light system in which the light source 17 is disposed along only one side edge of the optical waveguide sheet 11; a bilateral edge light system in which the light source 17 is disposed along each of the opposite side edges of the optical waveguide sheet 11; an entire circumference edge light system in which the light source 17 is disposed along each side edge of the optical waveguide sheet 11; and the like.

Production Method of Optical Waveguide Sheet 11

Next, a production method of the optical waveguide sheet 11 will be explained. However, the production method of the optical waveguide sheet 11 according to the embodiment of the present invention is not limited to the production method described below.

A production method of the optical waveguide sheet 11 includes: a first step of preparing respectively a forming material, of the optical waveguide layer 12 and a forming material of the protective layer 13; and a second step of coextruding the forming material of the optical waveguide layer 12 and the forming material of the protective layer 13 to form a laminated sheet composed of the optical waveguide layer 12 and the protective layer 13. In addition, the production method of the optical waveguide sheet 11 includes a third step of subjecting the laminated sheet laminated in the second step to laser irradiation to form light scattering portions 14 in the protective layer 13.

The first step is a step of dispersing various types of additives in a polycarbonate-based resin which is a principal component of the optical waveguide layer 12 to prepare the forming material of the optical waveguide layer 12, and dispersing various types of additives in an acrylic resin which is a principal component of the protective layer 13 to prepare the forming material of the protective layer 13.

The second step is a step of forming a laminated sheet composed of the optical waveguide layer 12 and the protective layer 13 through a coextrusion process. A T-die process, an inflation process and the like may be employed as the coextrusion molding process. The heating temperature for the forming material of the optical waveguide layer 12 and the forming material of the protective layer 13 in the second step is preferably no lower than 150° C. and no higher than 350° C., and more preferably no lower than 200° C. and no higher than 300° C.

Advantages

According to the backlight unit 10 of the ultraslim computer 1, rays of light from the light source 17 are emitted toward the liquid crystal panel 4 as follows. First, the rays of light, from the light source 17 enter the optical waveguide layer 12 of the optical waveguide sheet 11, and the rays of light propagate in the optical waveguide layer 12. Then, among the rays of light that propagate in the optical waveguide layer 12, a part of the rays of light that reach an interface between the optical waveguide layer 12 and the protective layer 13 enter the protective layer 13, and the other part thereof is reflected to the optical waveguide layer 12. Among the rays of light that enter the protective layer 13, the rays of light that enter the light scattering portions 14 are diffused, and a part of the diffused light enter again the optical waveguide layer 12, and thereafter exit from the front face of the optical waveguide layer 12 toward the liquid crystal panel 4. Furthermore, a part of the rays of light that enter the protective layer 13 exit from the back face of the protective layer 13. The rays of light that exit from the back face of the protective layer 13 are reflected on the front face (reflection surface 16a) of the top plate 11 and enter again the optical waveguide sheet 11 and thereafter exit from the front face of the optical waveguide sheet 11 toward the liquid crystal panel 4. Thus, according to the ultraslim computer 1, the reduction in thickness of the backlight unit 10 is achieved, since no reflection sheet is provided, as is different from conventional ones. Furthermore, since the optical waveguide sheet 11 is configured to have a two-layer structure composed of the optical waveguide layer 12 having a thickness within a certain range and the protective layer 13, the reduction in thickness of the optical waveguide sheet 11 itself is also achieved.

Moreover, in the backlight unit 10 of the ultraslim computer 1, the optical waveguide sheet 11 includes the protective layer 13 containing the acrylic resin as a principal component on the back face of the optical waveguide layer 12; therefore, the optical waveguide layer 12 is unlikely to be scuffed because of the abutment of the top plate 16 against the protective layer 13, even though the metal top plate 16 and the optical waveguide sheet 11 grazes against each other while the ultraslim computer 1 is carried. In addition, since the protective layer 13 contains the acrylic resin as a principal component, the scuff caused by the grazing of protective layer 13 against the top plate 16 is unlikely to occur. Thus, the lack in uniformity of luminance caused by the scuff of the optical waveguide sheet 11 can be reliably prevented.

Furthermore, since the optical waveguide layer 12 contains the polycarbonate-based resin as a principal component, and the optical waveguide layer 12 is thicker as compared with the protective layer 13, the optical waveguide sheet 11 sufficiently exhibits the properties such as durability and transparency that are required for the optical waveguide sheet 11.

Other Embodiments

Although the above embodiments include the aforementioned configurations, the present invention is not limited to the above embodiments. Specifically, in the above embodiments, the light scattering portions 14 being formed in the protective layer 13 are explained, but the present invention is not limited to this embodiment.

In addition, even when the optical waveguide sheet 11 includes the light scattering portions 14, it is also possible to form the light scattering portions 14 in the optical waveguide layer 12. Furthermore, even when the light scattering portions 14 are formed in the protective layer 13, it is also possible to form the light scattering portions 14 in the protective layer 13 in the interface between the protective layer 13 and the optical waveguide layer 12, or to form the light scattering portions 14 on the back face of the protective layer 13. It is to be noted that when the light scattering portions 14 are formed in the optical waveguide layer 12 or in the interface between the optical waveguide layer 12 and the protective layer 13, rays of light that propagate in the optical waveguide layer 12 enter the light scattering portions 14 and are scattered, possibly leading to complication of a disposition pattern of the light scattering portions 14, and therefore the light scattering portions 14 are preferably formed within the protective layer 13, as in the above embodiment. Furthermore, when the light scattering portions 14 are formed on the back face of the protective layer 13, the light scattering portions 14 may not exhibit desired optical functions due to the grazing against the front surface of the top plate 16, and therefore the light scattering portions 14 are preferably formed within the protective layer 13, as in the above embodiment.

In addition, the light scattering portions are not necessarily formed through the laser irradiation, and may be, for example, an irregular shape formed by a hot pressing molding process. Examples of the hot pressing molding process include a method in which light scattering portions having a desired shape is formed by carrying out the hot pressing using as a die a counterpart having a shape pairing with the respective light scattering portions.

Furthermore, although the optical waveguide sheet 11 of the embodiment of the present invention is explained in connection with the optical waveguide sheet 11 having a structure in which the optical waveguide layer 12 and the protective layer 13 are laminated through the coextrusion process, the present invention is not limited to the embodiment. Specifically, for example, the optical waveguide sheet 11 in which the optical waveguide layer 12 and the protective layer 13 each formed into a sheet are adhered and laminated via an adhesive layer is also encompassed within the intended scope of the present invention.

The edge-lit backlight unit may include a top plate disposed on the backmost face of a liquid crystal display unit, a reflection sheet overlaid on the front face of the top plate, the optical waveguide sheet according to the embodiment of the present invention overlaid on the front face of the reflection sheet, and a light source that emits rays of light toward the end face of the optical waveguide sheet. Furthermore, when the edge-lit backlight unit has such a configuration, it is not necessary that the front face of the top plate is formed to have a reflection surface. Even in this configuration, the edge-lit backlight unit according to the embodiment of the present invention can prevent the lack in uniformity of luminance, while achieving the reduction in thickness.

INDUSTRIAL APPLICABILITY

As explained above, according to the present invention, a reduction in thickness of a laptop computer is achieved while suppressing lack in uniformity of luminance of a liquid crystal display surface of the laptop computer, and therefore the present invention can be suitably applied to for example, ultraslim computers, Ultrabook, as generally referred to.

EXPLANATION OF THE REFERENCE SYMBOLS

1 laptop computer, ultraslim computer
2 operation unit
3 liquid crystal display unit
4 liquid crystal panel
6 casing for a liquid crystal display unit
7 front face support member
8 hinge part
9 casing for an operation unit
10 edge-lit backlight unit, backlight unit
11 optical waveguide sheet
12 optical waveguide layer
13 protective layer
14 light scattering portion
16 top plate
16a reflection surface
17 light source

What is claimed is:

1. An optical waveguide sheet for use in an edge-lit backlight unit of a liquid crystal display unit in a laptop computer having a housing thickness of no greater than 21 mm, the optical waveguide sheet configured to have a non-wedge shape and comprising:
   an optical waveguide layer comprising a polycarbonate-based resin as a principal component and being transparent; and
   a protective layer laminated on the back face of the optical waveguide layer, the protective layer comprising an acrylic resin as a principal component and being transparent, wherein a part of rays of light that enter the protective layer from the optical waveguide layer exit from the back face of the protective layer, and the rays of light that exit from the back face of the protective layer are reflected and enter again the protective layer from the back face thereof,
   a refractive index of the optical waveguide layer being no less than 1.57 and no greater than 1.68,
   a refractive index of the protective layer being no less than 1.47 and no greater than 1.51,
   a relative refractive index of the protective layer with respect to the optical waveguide layer being no greater than 0.95,
   the optical waveguide layer and the protective layer configured to provide the optical waveguide sheet with said non-wedge shape,
   an average thickness of the optical waveguide sheet being no less than 250 µm and no greater than 600 µm,
   an average thickness of the optical waveguide layer being no less than 200 µm and no greater than 590 µm, and
   an average thickness of the protective layer being no less than 10 µm and no greater than 100 µm.

2. The optical waveguide sheet according to claim 1, wherein the protective layer comprises light scattering portions colored through laser irradiation.

3. An edge-lit backlight unit, comprising:
   a top plate disposed on a backmost face of a liquid crystal display unit, a front face of the top plate being formed to have a reflection surface;
   the optical waveguide sheet according to claim 1, the optical waveguide sheet being overlaid on the front face of the top plate; and a light source that emits rays of light toward the end face of the optical waveguide sheet.

4. The edge-lit backlight unit according to claim 3, wherein the top plate is made of metal, and an arithmetic average roughness (Ra) of the reflection surface is no greater than 0.2 mm.

5. An edge-lit backlight unit, comprising:
a top plate disposed on a backmost face of a liquid crystal display unit;
a reflection sheet overlaid on the front face of the top plate;
the optical waveguide sheet according to claim 1, the optical waveguide sheet being overlaid on the front face of the reflection sheet; and
a light source that emits rays of light toward the end face of the optical waveguide sheet.

6. A laptop computer, comprising the edge-lit backlight unit according to claim 3 in a liquid crystal display unit.

7. A laptop computer, comprising the edge-lit backlight unit according to claim 5 in a liquid crystal display unit.

8. The laptop computer according to claim 6, wherein the laptop computer has a housing of thickness no greater than 21 mm.

9. The laptop computer according to claim 7, wherein the laptop computer has a housing of thickness no greater than 21 mm.

* * * * *